United States Patent

Ogawa

(10) Patent No.: US 7,621,838 B2
(45) Date of Patent: Nov. 24, 2009

(54) TRANSMISSION RATIO VARYING MECHANISM

(75) Inventor: Kenji Ogawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 405 days.

(21) Appl. No.: 11/790,172

(22) Filed: Apr. 24, 2007

(65) Prior Publication Data

US 2008/0113841 A1 May 15, 2008

(30) Foreign Application Priority Data

Nov. 9, 2006 (JP) .............................. 2006-303712

(51) Int. Cl.
*F16H 15/50* (2006.01)
*F16H 55/10* (2006.01)

(52) U.S. Cl. .................................... 475/168

(58) Field of Classification Search ................. 475/168
See application file for complete search history.

(56) References Cited

U.S. PATENT DOCUMENTS

| 846,273 A | * | 3/1907 | Wunderlich | 475/168 |
| 4,829,851 A | * | 5/1989 | Imase | 475/168 |
| 5,197,930 A | * | 3/1993 | Imase | 475/168 |
| 5,286,236 A | * | 2/1994 | Hosokawa et al. | 475/168 |

FOREIGN PATENT DOCUMENTS

| JP | 05010400 | * | 1/1993 |
| JP | 11227622 | | 8/1999 |
| JP | 2003172419 | | 6/2003 |
| JP | 2005178519 | | 7/2005 |
| JP | 2005247010 | | 9/2005 |
| JP | 2006-44402 A | | 2/2006 |
| JP | 2006143029 | | 6/2006 |
| WO | 2005115819 | | 12/2005 |

* cited by examiner

*Primary Examiner*—Sherry Estremsky
(74) *Attorney, Agent, or Firm*—Sughrue Mion, PLLC

(57) ABSTRACT

A transmission ratio varying mechanism is configured such that transmission of rotation between a first steering shaft and an eccentric rotary plate is performed via a first rotation transmitting ball group that engages with a third cycloidal groove and a first cycloidal groove and such that transmission of rotation between the eccentric rotary plate and a second steering shaft is performed via a second rotation transmitting ball group that engages with a second cycloidal groove and a fourth cycloidal groove.

9 Claims, 7 Drawing Sheets

TRANSMISSION RATIO VARYING MECHANISM

BACKGROUND OF THE INVENTION

1. Field of the Invention

The present invention relates to a transmission ratio varying mechanism used in a steering system of a vehicle, and more particularly to a transmission ratio varying mechanism that can vary transmission characteristics between the steering angle of a steering handle that a driver operates and the steering angle of steered wheels of the vehicle.

2. Description of the Related Art

Conventionally, a steering system of a vehicle is configured such that a transmission ratio varying mechanism is installed between a steering handle that a driver operates and steered wheels of the vehicle and so as to vary, in response to the running state of the vehicle, the transmission characteristics of the steering angle of the steered wheels with respect to the steering angle of the steering handle that the driver operates. The transmission characteristics of the steering angle of the steered wheels with respect to the steering angle of the steering handle are commonly changed by varying the transmission ratio of rotation between a steering shaft that rotates integrally with the steering handle and a steering shaft that rotates integrally with a member that steers a steering wheel. As a transmission ratio varying mechanism used in such a steering system, a transmission ratio varying mechanism using a wave gear mechanism in a mechanism portion that enables the transmission ratio of rotation to be varied has been proposed (e.g., see JP-A-2006-44402). The transmission ratio varying mechanism disclosed in JP-A-2006-44402 is configured by a stator gear connected to an input shaft, a driven gear connected to an output shaft, an elliptical wave generator connected to a motor for varying the transmission ratio, and a flexible gear that is disposed around the wave generator and simultaneously meshes with the aforementioned two gears.

In the transmission ratio varying mechanism disclosed in JP-A-2006-44402, the stator gear rotates by the rotation of the input shaft, and the flexible gear rotates while elastically deforming about the elliptical wave generator. Because the flexible gear meshes also with the driven gear, the rotation of the flexible gear is transmitted to the output shaft connected to the driven gear. When the wave generator is rotated by the motor, the meshed places between the flexible gear and the stator gear and the driven gear also synchronously rotate. Because the numbers of teeth that the stator gear and the driven gear have are different, rotation corresponding to this tooth number difference and the rotation angle of the wave generator are superposed on the output shaft.

In the case of the conventional transmission ratio varying mechanism using a wave gear in this manner, in terms of the structure of the wave gear mechanism there have been problems in that, although the input shaft is disposed so as to confine the driven gear from the outer periphery of the stator gear, it is necessary for the output shaft from the driven gear confined by the input shaft to be removed to the outside through the center of a through hole disposed in the wave generator, the structure is complicated, and therefore assembly is difficult. Further, because the flexible gear rotates while deforming due to the rotation of the input shaft, there has been the problem that a burden is applied to the input shaft. Moreover, there have also been such problems as, in terms of the principle of the wave gear mechanism, it is necessary to rotate the wave gear mechanism at a high speed because the reduction ratio to the superimposed rotation onto the output shaft with respect to the rotation of the wave generator becomes larger.

SUMMARY OF THE INVENTION

The present invention has been made in order to address these problems in conventional transmission ratio varying mechanisms, and it is an object thereof to provide a transmission ratio varying mechanism that can easily vary the transmission ratio with a simple configuration.

A transmission ratio varying mechanism according to this invention is transmission ratio varying mechanism that is joined to a first steering shaft that rotates integrally with a steering handle and to a second steering shaft that is disposed coaxially with the first steering shaft and rotates integrally with a steering member that steers steered wheels, with the transmission ratio varying mechanism performing transmission of rotation between the first steering shaft and the second steering shaft and being capable of varying the transmission ratio of that rotation, the transmission ratio varying mechanism including: an eccentric rotary plate that is disposed facing the first steering shaft and the second steering shaft and is eccentrically rotatable with respect to these steering shafts; a carrier that rotatably supports the eccentric rotary plate and is rotatably disposed coaxially with respect to the first steering shaft and the second steering shaft; and carrier driving means that causes the carrier to rotate. wherein the eccentric rotary plate includes, in its surface facing the first steering shaft, a first cycloidal groove configured on the basis of a cycloidal curve and includes, in its surface facing the second steering shaft, a second cycloidal groove configured on the basis of a cycloidal curve, the first steering shaft includes, in its surface facing the eccentric rotary plate, a third cycloidal groove configured on the basis of a cycloidal curve, the second steering shaft includes, in its surface facing the eccentric rotary plate, a fourth cycloidal groove configured on the basis of a cycloidal curve, the first cycloidal groove and the second cycloidal groove are formed concentrically with an axial center of the eccentric rotary plate, the third cycloidal groove and the fourth cycloidal groove are formed concentrically with an axial center of the first steering shaft and the second steering shaft, transmission of the rotation of the first steering shaft and the eccentric rotary plate is performed via a first rotation transmitting ball group that engages with the third cycloidal groove and the first cycloidal groove, transmission of the rotation of the eccentric rotary plate and the second steering, shaft is performed via a second rotation transmitting ball group that engages with the second cycloidal groove and the fourth cycloidal groove, the first to fourth cycloidal grooves are configured to vary the transmission ratio of the rotation between the first steering shaft and the eccentric rotary plate and the transmission ratio of the rotation between the second steering shaft and the eccentric rotary plate, and the carrier driving means causes the carrier to rotate, whereby the transmission ratio varying mechanism varies the transmission ratio of the rotation between the first steering shaft and the second steering shaft.

According to the transmission ratio varying mechanism of this invention, transmission of the rotation of the first steering shaft and the eccentric rotary plate is performed via the first rotation transmitting ball group that engages with the third cycloidal groove and the first cycloidal groove, transmission of the rotation of the eccentric rotary plate and the second steering shaft is performed via the second rotation transmitting ball group that engages with the second cycloidal groove and the fourth cycloidal grooves are configured to vary the transmission ratio of the rotation between the first steering shaft and the eccentric rotary plate and the transmission ratio of the rotation between the second steering shaft and the eccentric rotary plate, and the carrier driving means causes the carrier to rotate, whereby the transmission ratio varying mechanism varies the transmission ratio of the rotation between the first steering shaft and the second steering shaft, so there is the effect that the structure of the transmission ratio varying mechanism is simple and the transmission ratio varying mechanism can easily vary the transmission ratio of the rotation of the first steering shaft and the second steering shaft.

The foregoing and other object, features, and advantages of the present invention will become more apparent from the following detailed description of the present invention when taken in conjunction with the accompanying drawings.

BRIEF DESCRIPTION OF THE DRAWINGS

Exemplary embodiments of the present invention will be described on the basis of the attached drawings, wherein.

DETAILED DESCRIPTION OF THE PREFERRED EMBODIMENTS

First Exemplary Embodiment

Figure 1:
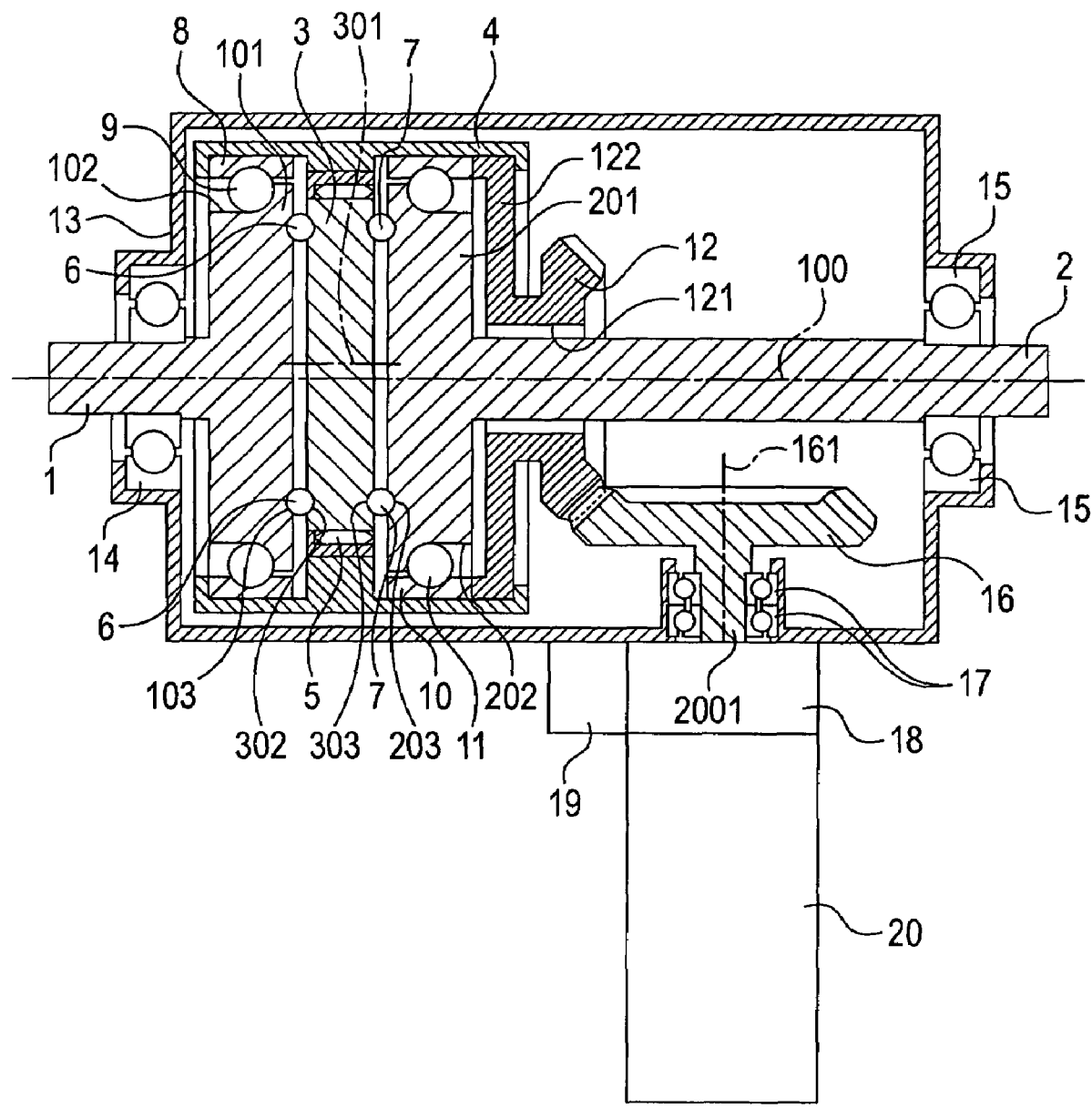
FIG. 1 is a cross-sectional diagram showing the configuration of a transmission ratio varying mechanism pertaining to a first exemplary embodiment of this invention.

FIG. 1 is a cross-sectional diagram showing the configuration of a transmission ratio varying mechanism pertaining to a first exemplary embodiment of this invention. In FIG. 1, a first steering shaft 1 is supported, such that it may freely rotate, in a housing 13 by a first bearing 14 comprising a ball bearing, and the first steering shaft 1 rotates integrally with a steering handle (not shown) that a driver operates. An end portion 101 of the first steering shaft 1 is configured in a discoid shape, and a first concave groove 102 is annularly formed in the outer peripheral portion thereof. A second steering shaft 2 is disposed coaxially with the first steering shaft 1 and is supported, such that it may freely rotate, in the housing 13 by a second bearing 15 comprising a ball bearing. An end portion 201 of the second steering shaft 2 is configured in a discoid shape, and a second concave groove 202 is annularly formed in the outer peripheral portion thereof.

A first outer wheel 8 is attached, such that it may freely rotate, to the outer peripheral portion of the end portion 101 of the first steering shaft 1 via a first rotation supporting ball group 9 that engages with the first concave groove 102. A second outer wheel 10 is attached, such that it may freely rotate, to the outer peripheral portion of the end portion 201 of the second steering shaft 2 via a second rotation supporting ball group 11 that engages with the second concave groove 202. The outer peripheral surfaces of the first outer wheel 8 and the second outer wheel 10 are fixed to the inner peripheral surface of a carrier 4 that is formed in a substantially circular cylinder shape. The carrier 4 is supported, such that it may freely rotate, on the end portion 101 of the first steering shaft 1 and the end portion 201 of the second steering shaft 2 via the first rotation supporting ball group 9 and the first outer wheel 8 and via the second rotation supporting ball group 11 and the second outer wheel 10.

An eccentric rotary plate 3 formed in a discoid shape is disposed between the end portion 101 of the first steering shaft 1 and the end portion 201 of the second steering shaft 2, and the surfaces of both side portions thereof respectively face, via gaps, the surface of the end portion 101 of the first steering shaft 1 and the surface of the end portion 201 of the second steering shaft 2. The eccentric rotary plate 3 is supported, such that it may freely rotate, on the inner peripheral surface of the carrier 4 via a bearing 5 comprising a needle roller. Moreover, an axial center 301 of the eccentric rotary plate 3 is disposed a predetermined distance away from an axial center 100 of the first steering shaft 1 and the second steering shaft 2, and the eccentric rotary plate 3 rotates eccentrically with respect to the first steering shaft 1 and the second steering shaft 2.

A first cycloidal groove 302 configured on the basis of a later-described hypocycloidal curve is formed in the surface of the eccentric rotary plate 3 facing the surface of the end portion 101 of the first steering shaft 1. A second cycloidal groove 303 configured on the basis of a later-described hypocycloidal curve is formed in the surface of the eccentric rotary plate 3 facing the surface of the end portion 201 of the second steering shaft 2. The first cycloidal groove 302 and the second cycloidal groove 303 are formed concentrically with the eccentric rotary plate 3.

A third cycloidal groove 103 configured on the basis of a later-described epicycloidal curve is formed in the surface of the end portion 101 of the first steering shaft 1. Further, a fourth cycloidal groove 203 configured on the basis of a later-described epicycloidal curve is formed in the surface of the end portion 201 of the second steering shaft 2. The third cycloidal groove 103 and the fourth cycloidal groove 203 are formed concentrically with the first steering shaft 1 and the second steering shaft 2.

A first rotation transmitting ball group 6 is disposed between the surface of the end portion 101 of the first steering shaft 1 and one surface of the eccentric rotary plate 3 and engages with, such that it can roll in, the third cycloidal groove 103 and the first cycloidal groove 302 as described later. A second rotation transmitting ball group 7 is disposed between the surface of the end portion 201 of the second steering shaft 2 and the other surface of the eccentric rotary plate 3 and engages with, such that it can roll in, the second cycloidal groove 303 and the fourth cycloidal groove 203 as described later. Further, as described later, pressure is applied by the carrier 4 in the direction of the eccentric rotary plate 3 to the first steering shaft 1 and the second steering shaft 2.

The outer peripheral surface of a support 122 formed in the discoid shape of a first gear 12 configured by an annular umbrella gear is fixed to the inner peripheral surface of the carrier 4, and the first gear 12 rotates integrally with the carrier 4. Further, the first gear 12 includes a center hole 121 in its center portion, and the second steering shaft 2 penetrates the center hole 121. A second gear 16 configured by an annular umbrella gear meshes with the first gear 12. The first gear 12 an axial center on the same straight line as the axial center of the carrier 4, and the second gear 16 includes an axial center in a direction orthogonal to the direction of the axial center of the carrier 4.

The housing 13 is formed in a substantially circular cylinder shape and houses therein the end portion 101 of the first steering shaft 1, the end portion 201 of the second steering shaft 2, the carrier 4, the first gear 12, and the second gear 16.

A motor 20 configuring carrier driving means is fixed to the outer surface portion of the housing 13, and an end portion of a rotor shaft 2001 of the motor 20 and the second gear 16 are integrally fixed. Further, the rotor shaft 2001 of the motor 20 and the second gear 16 are supported, such that they may freely rotate, by a third bearing 17 comprising a ball bearing. The motor 20 causes the carrier 4 to rotate via the first gear 12 by causing the second gear 16 to rotate. Carrier fixing means 19 disposed on the outer surface portion of the housing 13 prohibits the rotation of the carrier 4 via the first gear 12 by prohibiting the rotation of the second gear 16. The carrier fixing means 19 is configured by a fixing claw (not shown) that is driven by the bias of a solenoid (not shown) and a carrier fixing rotary plate (not shown) that includes a fixing groove capable of engaging with the fixing claw and is fixed to the second gear 16.

When the solenoid of the carrier fixing means 19 is OFF (not powered), the fixing claw engages with the fixing groove in the carrier fixing rotary plate to prohibit the rotation of the carrier fixing rotary plate and to prohibit the rotation of the carrier 4 via the second gear 16 and the first gear 12. Further, the engagement between the fixing claw and the fixing groove in the carrier fixing rotary plate is released by the bias (powering) of the solenoid so that the carrier fixing rotary plate becomes rotatable and the carrier 4 becomes rotatable. It will be noted that the fixing claw may be caused to engaged with the fixing groove by the bias of the solenoid to fix the carrier 4 and that the engagement may be released by turning OFF the solenoid to enable the rotation of the carrier 4, but it is preferable to configure the carrier fixing means 19 to fix the carrier 4 when the solenoid is OFF and to allow the rotation of the carrier 4 during biasing of the solenoid. It will be also noted that a fixing hole that engages with the fixing claw may be disposed instead of a fixing groove that engages with the fixing claw.

Carrier rotation allowing means 18 is disposed between the carrier fixing means 19 and the second gear 16. The carrier rotation allowing means 18 allows the rotation of the second gear 16 to enable the rotation of the carrier 4 when an excessive torque is applied between the first steering shaft 1 and the second steering shaft 2 and force equal to or greater than a predetermined value is applied to the carrier fixing means 19 in a state where the carrier 4 is fixed by the carrier fixing means 19, and prevents a rudder angle superposing mechanism using the first to fourth cycloidal grooves 302, 303, 103, and 203 from being broken. The carrier rotation allowing means 18 can be configured by a torque limiter that allows the rotation of the second gear 16 when a torque equal to or greater than a predetermined value is applied to the connection portion between the aforementioned carrier fixing rotary plate including the fixing groove and the second gear 16.

Next, the first to fourth cycloidal grooves 302, 303, 103, and 203 formed in the surfaces of the eccentric rotary plate 3, the first steering shaft 1, and the second steering shaft 2 will be described. The first cycloidal groove 302 and the second cycloidal groove 303 respectively formed in the surfaces of both side portions of the eccentric rotary plate 3 are respectively configured on the basis of a hypocycloidal curve, and the third cycloidal groove 103 formed in the surface of the end portion 101 of the first steering shaft 1 and the fourth cycloidal groove 203 formed in the surface of the end portion 201 of the second steering shaft 2 are respectively configured on the basis of an epicycloidal curve.

Figure 2A:
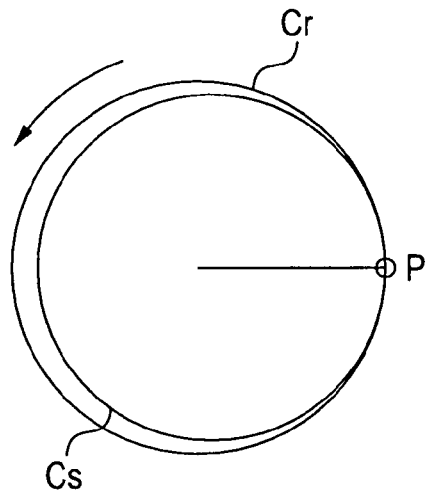
FIGS. 2A to 2C are descriptive diagrams describing an epicycloidal curve.
Figure 2B:
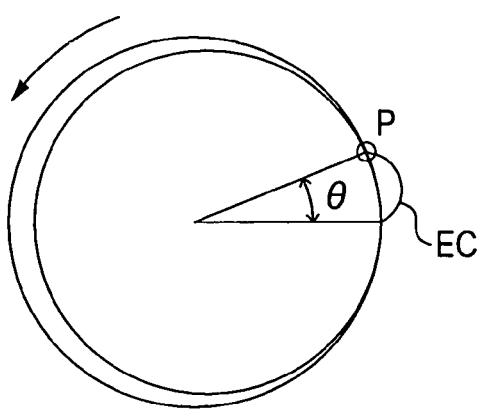
Figure 2C:
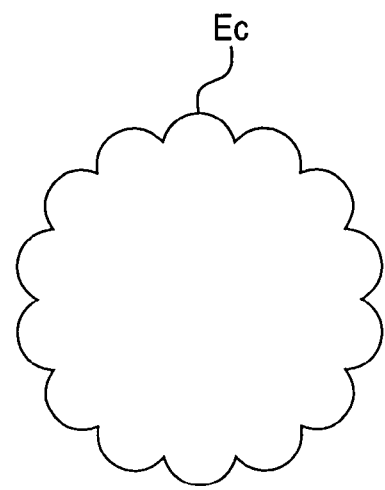

First, the epicycloidal curve will be described. FIGS. 2A to 2C are descriptive diagrams of the epicycloidal curve. As shown in FIGS. 2A and 2B, when a large circle Cr is disposed so as to contact the outer periphery of a small circle Cs, an epicycloidal curve Ec shown in FIG. 2C is a locus drawn by one point P on the large circle Cr when the large circle Cr is rotated while contacting the small circle Cs. Here, Rr represents the radius of the large circle Cr, and dR represents the difference between the radii of the large circle Cr and the small circle Cs. When the large circle Cr starts rotating from the position shown in FIG. 2A and completes exactly one rotation (360°) about the small circle Cs, the large circle Cr reaches the position shown in FIG. 2B.

At this time, due to the difference between the circumference of the large circle Cr and the circumference of the small circle Cs, the large circle Cr rotates from the position shown in FIG. 2A to the position shown in FIG. 2B, and the locus of the one point P on the large circle Cr becomes Ec shown in FIG. 2B. When $\theta$ represents the rotation angle of the large circle Cr, this rotation angle $\theta$ is expressed by the following expression (1).

$$\theta = \frac{2\pi Rr - 2\pi(Rr - dR)}{2\pi Rr} \times 360 = \frac{dR}{Rr} \times 360 \qquad \text{expression (1)}$$

Consequently, in order for the one point P on the large circle Cr to return to its initial position shown in FIG. 2A, the radius Rr of the large circle Cr must be a multiple of the difference dR between the radii of the large circle Cr and the small circle Cs. Further, when $\phi$ represents the rotation angle of the point of contact between the large circle Cr and the small circle Cs, the rotation angle $\theta$ of the large circle Cr is expressed by the following expression (2) from expression (1).

$$\theta = \frac{dR}{Rr} \times \mathrm{mod}\ (\phi, 360) \qquad \text{expression (2)}$$

Here, mod ($\phi$, 360) represents a remainder when $\phi$ is divided by 360°.

Next, when $\psi$ represents the rotation angle of the large circle Cr when the large circle Cr starts rotating from the position shown in FIG. 2A and the one point P on the large circle Cr first contacts the small circle Cs, the following expression (3) is established from expression (2) and from the fact that the rotation angle $\theta$ of the large circle Cr and [mod ($\phi$, 360)] that is the rotation angle of the point of contact between the large circle Cr and the small circle Cs coincide.

$$\psi = \frac{dR}{Rr} \times (\psi + 360) \qquad \text{expression (3)}$$

When expression (3) is solved in regard to $\psi$, the following expression (4) is obtained.

$$\psi = \frac{dR}{Rr - dR} \times 360 \qquad \text{expression (4)}$$

Expression (4) means that the one point P on the large circle Cr contacts the small circle Cs at every angle ψ. Consequently, number (wave number) n of the repeat of the epicycloidal curve Ec is expressed by the following expression (5) from expression (4).

$$n = 360 \div \left(\frac{dR}{Rr - dR} \times 360\right) = \frac{Rr}{dR} - 1 \qquad \text{expression (5)}$$

Figure 3A:
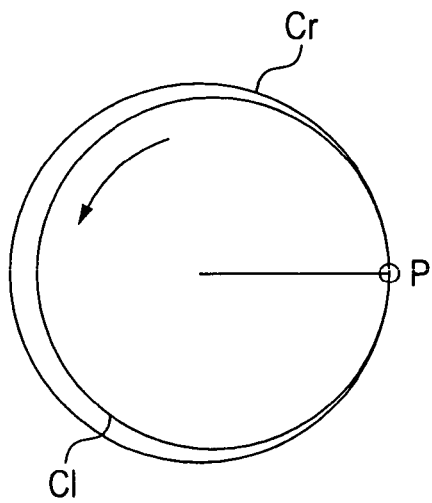
FIGS. 3A to 3C are descriptive diagrams describing a hypocycloidal curve.
Figure 3B:
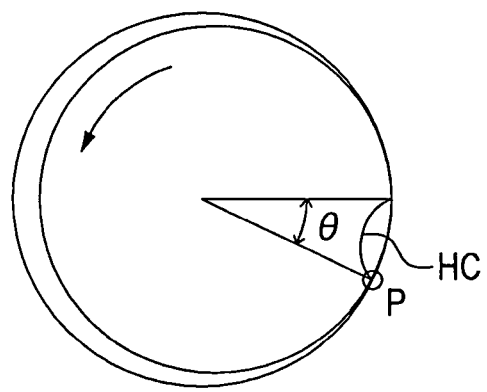
Figure 3C:
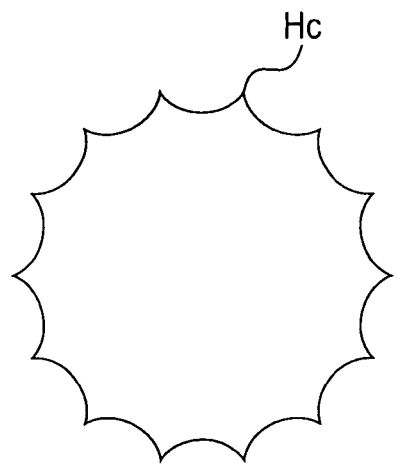

Next, the hypocycloidal curve will be described. FIGS. 3A to 3C are descriptive diagrams of the hypocycloidal curve. As shown in FIGS. 3A and 3B, when a small circle Cr is disposed so as to contact the inner periphery of a large circle Cl, a hypocycloidal curve Hc shown in FIG. 3C is a locus drawn by one point P on the small circle Cr when the small circle Cr is rotated while contacting the large circle Cl. Here, dR represents the difference between the radius Rr of the small circle Cr and the radius of the large circle Cl. When the small circle Cr starts rotating from the position shown in FIG. 3A and completes exactly one rotation (360°) about the inner periphery of the large circle Cl, the small circle Cr reaches the position shown in FIG. 3B.

At this time, due to the difference between the circumference of the small circle Cr and the circumference of the large circle Cl, the small circle Cr rotates from the position shown in FIG. 3A to the position shown in FIG. 3B, and the locus of the one point P on the small circle Cr becomes Hc shown in FIG. 3B. When θ represents the rotation angle of the small circle Cr, this rotation angle θ is expressed by the following expression (6).

$$\theta = \frac{2\pi Rr - 2\pi(Rr + dR)}{2\pi Rr} \times 360 = -\frac{dR}{Rr} \times 360 \qquad \text{expression (6)}$$

Consequently, in order for the one point P on the small circle Cr to return to its initial position, the radius Rr of the small circle Cr must be a multiple of the difference dR between the radius Rr of the small circle Cr and the radius of the large circle Cl. Further, when φ represents the rotation angle of the point of contact between the small circle Cr and the large circle Cl, the rotation angle θ of the small circle Cr is expressed by the following expression (7) from expression (6).

$$\theta = -\frac{dR}{Rr} \times \mod(\phi, 360) \qquad \text{expression (7)}$$

Here, mod (φ, 360) represents a remainder when φ is divided by 360°.

Next, when ψ represents the rotation angle of the small circle Cr when the small circle Cr starts rotating from the position shown in FIG. 3A and the one point P on the small circle Cr first contacts the large circle Cl, the following expression (8) is established from expression (7) and from the fact that the rotation angle θ of the small circle Cr and [mod (φ, 360)] that is the rotation angle of the point of contact between the small circle Cr and the large circle Cl coincide.

$$\psi = -\frac{dR}{Rr} \times (\psi + 360) \qquad \text{expression (8)}$$

When expression (8) is solved in regard to ψ, the following expression (9) is obtained.

$$\psi = -\frac{dR}{Rr + dR} \times 360 \qquad \text{expression (9)}$$

Expression (9) means that the one point P on the small circle Cr contacts the large circle Cl at every angle ψ. Consequently, number (wave number) n of the repeat of the hypocycloidal curve Hc is expressed by the following expression (10) from expression (9).

$$n = 360 \div \left(\frac{dR}{Rr + dR} \times 360\right) = \frac{Rr}{dR} + 1 \qquad \text{expression (10)}$$

Figure 4A:
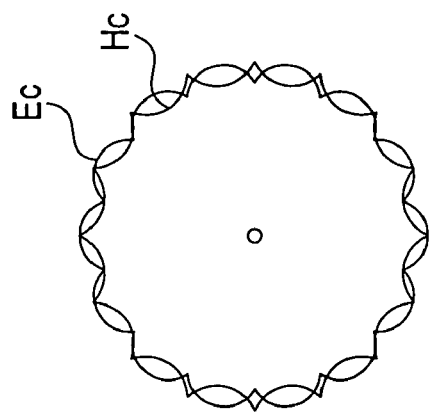
FIGS. 4A to 4F are descriptive diagrams describing rotation transmission resulting from the epicycloidal curve and the hypocycloidal curve.

Next, rotation transmission resulting from the combination of the epicycloidal curve Ec and the hypocycloidal curve Hc will be described on the basis of FIGS. 4A to 4F. FIG. 4A is a diagram showing the superposition of the center of the epicycloidal curve Ec and the center of the hypocycloidal curve Hc and in which the radii of the large circle Cr of the epicycloidal curve Ec and the small circle Cr of the hypocycloidal curve Hc are represented by the same Rr. The circle of this radius Rr is called a basic circle. Further, FIG. 4A is a diagram where the difference between the radii of the large circle Cr and the small circle Cs in the epicycloidal curve and the difference between the radii of the large circle Cl and the small circle Cr in the hypocycloidal curve Hc are represented by the same dR to form cycloidal curves.

Figure 4B:
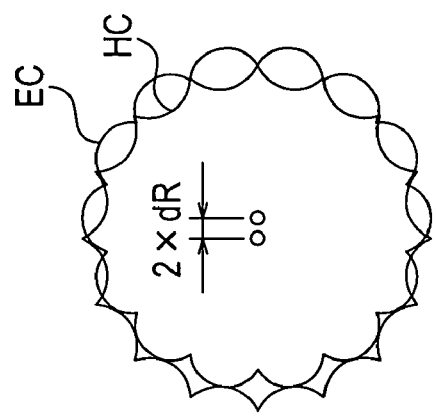
Figure 4C:
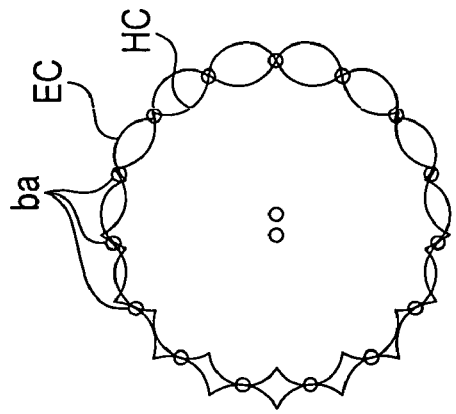

FIG. 4B shows the center of the epicycloidal curve Ec and the center of the hypocycloidal curve Hc having been made eccentric by [2×dR]. When the epicycloidal curve Ec and the hypocycloidal curve Hc are made eccentric in this manner, then as shown in FIG. 4C, the epicycloidal curve Ec and the hypocycloidal curve Hc have a number of points of contact ba equal to [Rr/dR].

Figure 4D:
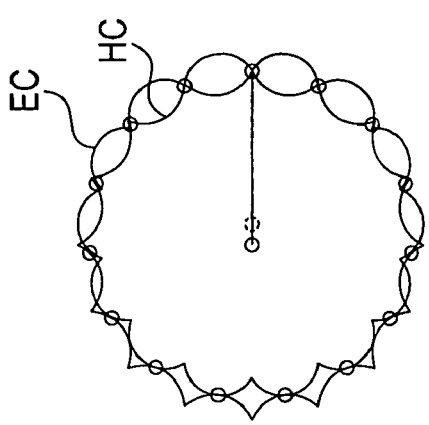
Figure 4E:
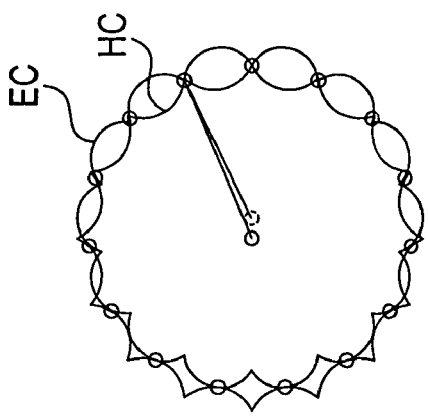
Figure 4F:
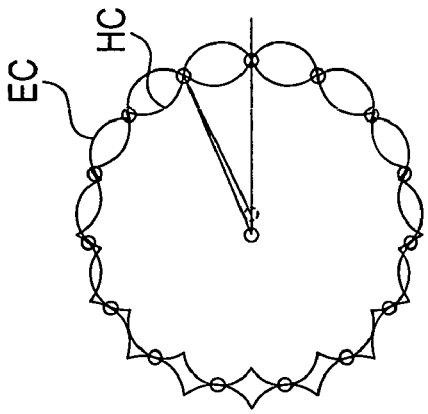

Next, a situation when the epicycloidal curve Ec and the hypocycloidal curve Hc are rotated while contacting each other will be considered. FIG. 4D shows an initial state of rotation. FIG. 4E shows a state where the epicycloidal curve Ec and the hypocycloidal curve Hc are caused to rotate while contacting each other. FIG. 4F shows a state when the epicycloidal curve Ec completes exactly one rotation (one wave rotation), and shows the hypocycloidal curve Hc also completing one rotation (one wave rotation). That is, when ne represents the wave number of the epicycloidal curve Ec and nh represents the wave number of the hypocycloidal curve Hc, then the wave number ne of the epicycloidal curve Ec and the wave number nh of the hypocycloidal curve Hc are expressed by the following expression (11) respectively by expression (5) and expression (10).

$$ne = \frac{Rr}{dR} - 1 \qquad \text{expression (11)}$$

-continued $$nh = \frac{Rr}{dR} + 1$$

Consequently, the transmission ratio (also called change gear ratio, but in the following description this will be called transmission ratio of rotation) G of the rotation of the epicycloidal curve Ec and the hypocycloidal curve Hc becomes the following expression (12) from expression (11).

$$G = \frac{ne}{nh} = \frac{\frac{Rr}{dR} - 1}{\frac{Rr}{dR} + 1} = \frac{Rr - dR}{Rr + dR} \qquad \text{expression (12)}$$

Next, the configuration of the transmission ratio varying mechanism according to the first exemplary embodiment of this invention will be described more specifically. In FIG. 1, as mentioned previously, the third cycloidal groove 103 is formed in the first steering shaft 1. The third cycloidal groove 103 is configured on the basis of the aforementioned epicycloidal curve Ec, Rr1 represents the radius of the basic circle thereof, and dR represents the difference between the radii of the large circle and the small circle. The first cycloidal groove 302 formed in the eccentric rotary plate 3 facing the third cycloidal groove 103 is configured on the basis of the aforementioned hypocycloidal curve Hc, the radius of the basic circle thereof is the same Rr1 as the radius of the basic circle of the third cycloidal groove, and the difference between the radii of the large circle and the small circle is the same dR as the difference between the large circle and the small circle of the third cycloidal groove 103. Here, the basic circle of the radius Rr1 will be called a first basic circle.

The eccentric rotary plate 3 is supported, such that it may freely rotate, by the carrier 4 with the axial center 301 of the eccentric rotary plate 3 being eccentric [2×dR] with respect to the axial center 100 of the first steering shaft 1. Consequently, as mentioned previously, the number of contact points ba between the first cycloidal groove 302 and the third cycloidal groove 103 becomes equal to [Rr1/dR], and the first rotation transmitting ball group 6 is disposed at the places of the contact points ba. That is, the first rotation transmitting ball group 6 works to restrict the relative positional relationship of the first cycloidal groove 302 and the third cycloidal groove 103 and transmits the rotation of the first steering shaft 1 to the eccentric rotary plate 3.

The transmission ratio G1 of the rotation between the first steering shaft 1 and the eccentric rotary plate 3 is determined by the following expression (13).

$$G1 = \frac{Rr1 - dR}{Rr1 + dR} \qquad \text{expression (13)}$$

The fourth cycloidal groove 203 is formed in the second steering shaft 2. The fourth cycloidal groove 203 is configured on the basis of the aforementioned epicycloidal curve Ec, Rr2 represents the radius of the basic circle thereof, and dR represents the difference between the radii of the large circle and the small circle. The second cycloidal groove 303 formed in the eccentric rotary plate 3 facing the fourth cycloidal groove 203 is configured on the basis of the aforementioned hypocycloidal curve Hc, the radius of the basic circle thereof is represented by the same Rr2 as the radius of the basic circle of the fourth cycloidal groove, and the difference between the radii of the large circle and the small circle is the same dR as the difference between the radii of the large circle and the small circle in the fourth cycloidal groove 203. Here, the basic circle of the radius Rr2 will be called a second basic circle.

The relationship between the fourth cycloidal groove 203 and the second cycloidal groove 303 is the same as the relationship between the third cycloidal groove 103 and the first cycloidal groove 302 except that the radii of the basic circles are different.

As mentioned previously, the eccentric rotary plate 3 is supported, such that it may freely rotate, by the carrier 4 with the axial center 301 of the eccentric rotary plate 3 being eccentric [2×dR] with respect to the axial center 100 of the first steering shaft 1. Consequently, as mentioned previously, the number of contact points ba between the second cycloidal groove 303 and the fourth cycloidal groove 203 becomes equal to [Rr2/dR], and the second rotation transmitting ball group 7 is disposed at the places of the contact points ba. That is, the second rotation transmitting ball group 7 works to restrict the relative positional relationship between the second cycloidal groove 303 and the fourth cycloidal groove 203 and transmits the rotation of the eccentric rotary plate 3 to the second steering shaft 2.

The first steering shaft 1 and the second steering shaft 2 are disposed coaxially, and consequently the eccentricity value of the first cycloidal groove 302 and the third cycloidal groove 103 and the eccentricity value of the second cycloidal groove 303 and the fourth cycloidal groove 203 are the same value [2×dR].

Here, the transmission ratio G2 of the rotation between the eccentric rotary plate 3 and the second steering shaft 2 is determined by the following expression (14).

$$G2 = \frac{Rr2 + dR}{Rr2 - dR} \qquad \text{expression (14)}$$

Consequently, the transmission ratio Gs of the rotation between the first steering shaft 1 and the second steering shaft 2 is determined by the following expression (15).

$$Gs = G1 \times G2 = \frac{Rr1 - dR}{Rr1 + dR} \times \frac{Rr2 + dR}{Rr2 - dR} \qquad \text{expression (15)}$$

Next, rotation of the second steering shaft 2 when the first steering shaft 1 is fixed and the carrier 4 is rotated with respect to the first steering shaft 1 will be described. First, when the first steering shaft 1, the carrier 4, and the second steering shaft 2 are integrally rotated an angle of σ, naturally the carrier 4 and the second steering shaft 2 also rotate an angle of σ. Here, when just the first steering shaft 1 is rotated an angle of σ, that is, an angle of σ in the opposite direction, it is the same as when just the carrier 4 is rotated an angle of a without the first steering shaft 1 being rotated. Consequently, when just the first steering shaft 1 is rotated an angle of σ, the second steering shaft 2 rotates on the basis of the transmission ratio Gs of the rotation expressed in expression (15).

Thus, when the first steering shaft 1 is fixed and the carrier 4 is rotated an angle of σ, the rotation angle ω of the second steering shaft 2 can be determined by the following expression (16).

$$\omega = \delta - Gs \times \delta = \delta(1 - Gs) \qquad \text{expression (16)}$$

Consequently, the transmission ratio Ga of the rotation to the second steering shaft 2 with respect to the carrier 4 is determined by the following expression (17).

$$Ga = \frac{\omega}{\delta} = (1 - Gs) \qquad \text{expression (17)}$$

To summarize what has been described above, when θ1 represents the rotation of the first steering shaft 1 and θc represents the rotation of the carrier 4, the rotation angle θ2 of the second steering shaft 2 can be expressed by the following expression (18)

$$\theta 2 = Gs \times \theta 1 + (1 - Gs) \times \theta c \qquad \text{expression (18)}$$

In this manner, the rotation angle θ2 of the second steering shaft 2 superposes the rotation angle [(1 Gs)×θc] based on the rotation angle θc of the carrier 4 on the rotation angle [Gs×θ1] based on the rotation angle θ1 of the first steering shaft 1. By controlling the rotation angle θc of the carrier 4 with the motor 20, it is possible to optionally obtain the rotation angle θ2 of the second steering shaft 2 regardless of the rotation angle θ1 of the first steering shaft 1, and the transmission ratio of the rotation between the first steering shaft 1 and the second steering shaft 2 can be varied.

Pressure in the axial direction toward the eccentric rotary plate 3 is respectively applied to the first steering shaft 1 and the second steering shaft 2. Due to this pressure in the axial direction, backlash of the rotation of the reduction mechanism configured by a combination of the first to fourth cycloidal grooves 302, 303, 103, and 203 and the first and second rotation transmitting ball groups 6 and 7 can be made zero. Further, there is the characteristic that contact between the first to fourth cycloidal grooves 302, 303, 103, and 203 and the first and second rotation transmitting ball groups 6 and 7 is ball rolling contact, so that even if pressure in the axial direction is applied to the first steering shaft 1 and the second steering shaft 2, friction does not increase as in a gear mechanism.

As the mechanism that applies pressure in the direction of the eccentric rotary plate 3 to the first steering shaft 1 and the second steering shaft 2, a configuration that applies pressure by always biasing the first steering shaft 1 and the second steering shaft 2 in the direction of the eccentric rotary plate 3 by a spring washer, or a configuration that applies pressure in the direction of the eccentric rotary plate 3 to the first steering shaft 1 and the second steering shaft 2 by press-fitting and fixing, in fixed positions in the inner peripheral surface of the carrier 4, the first outer wheel 8 that rotates and supports the first steering shaft 1 and the second outer wheel 10 that rotates and supports the second steering shaft 2, are applicable, but in the first exemplary embodiment of this invention, the latter is employed.

Because pressure is applied in the direction of the eccentric rotary plate 3 to the first steering shaft 1 and the second steering shaft 2, the configuration that rotates and supports the carrier 4 by the first steering shaft 1 and the second steering shaft 2 is preferably a configuration like that of an angular bearing that is capable of also receiving force in the axial direction in addition to force in the direction orthogonal to the axis. Further, in order to balance the pressure between the first steering shaft 1 and the eccentric rotary plate 3 and the pressure between the second steering shaft 2 and the eccentric rotary plate 3, a bearing of a structure that does not support force in the axial direction is suitable for the bearing 5 that rotates and supports the eccentric rotary plate 3 on the carrier 4. As such a bearing, a bearing using a needle roller is suitable, and particularly a bearing of a structure where a needle roller directly supports the outer peripheral surface of the eccentric rotary plate 3 is preferable in terms of making the bearing compact.

It is preferable to administer hardening such as carburizing or high-frequency quenching in order to increase load resistance and durability to the inner surfaces of the first concave groove 102 and the first outer wheel 8 against which the first rotation supporting ball group 9 rolls, the inner surfaces of the second concave groove 202 and the second outer wheel 10 against which the second rotation supporting ball group 11 rolls, the outer peripheral surface of the eccentric rotary plate 3 and the inner peripheral surface of the carrier 4 facing this outer peripheral surface on which the bearing 5 comprising a needle roller rolls, and the inner surfaces of the first to fourth cycloidal grooves 302, 303, 103, and 203.

Next, the configuration that causes the carrier 4 to rotate will be described. As shown in FIG. 1, the carrier 4 rotates about the first steering shaft 1 and the second steering shaft 2. Consequently, the carrier 4 cannot be directly driven by an ordinary motor. Thus, as mentioned previously, the first gear 12 for transmitting rotation to the carrier 4, and the second gear 16 is disposed so as to mesh with the first gear 12. Umbrella gears are used for the first gear 12 and the second gear 16, and the first gear 12 and the second gear 16 are supported, such that they may freely rotate, in the housing 13 by the third bearing 17 comprising a ball bearing in order to minimize backlash. This backlash does not become a practical problem because the transmission ratio [1 Gs] of the rotation to the second steering shaft 2 with respect to the carrier 4 is multiplied therewith and it is reduced and transmitted to the second steering shaft 2.

Further, the rotation angle of the carrier 4 is controlled by the motor 20, but it is possible for the rotor of the motor 20 to become freely rotatable due to failure of the motor 20 or failure of a device controlling the motor 20. When the rotor of the motor 20 becomes freely rotatable, the second steering shaft 2 becomes capable of freely rotating with respect to the first steering shaft 1. This means that steering of the steering handle is not transmitted to the steering wheel. In order to prevent this, the carrier fixing means 19 prohibits the rotation of the second gear 16 and prohibits the rotation of the carrier 4.

In the transmission ratio varying mechanism pertaining to the first exemplary embodiment of this invention configured as described above, when the driver steers the steering handle and causes the first steering shaft 1 to rotate by an angle of θ1, the second steering shaft 2 rotates by an angle of θ2 based on expression (18) so that the steering wheel can be steered an angle of θ2. Additionally, because the rotation angle θc of the carrier 4 is controlled by the motor 20, it is possible to optionally obtain the rotation angle θ2 of the second steering shaft 2 regardless of the rotation angle θ1 of the first steering shaft 1, and the transmission ratio of the rotation between the first steering shaft 1 and the second steering shaft 2 can be varied.

Further, because the rotation of the carrier 4 is prohibited by the carrier fixing means 19, the rotation of the first steering shaft 1 can be directly transmitted to the second steering shaft 2, so that a situation where steering is impossible arising when the carrier 4 has become freely rotatable due to failure of the motor 20, for example, can be prevented.

Moreover, because the rotation of the carrier 4 is allowed by the carrier rotation allowing means 18 when a force equal to or greater than a predetermined value acts on the carrier fixing means 19, the rotation of the carrier 4 can be allowed and failure of the transmission ratio varying mechanism can be prevented when an excessive torque is applied to the first steering shaft 1 when, for example, the second steering shaft 2 is mechanically fixed.

It will be noted that the combination of the epicycloidal curve and the hypocycloidal curve in the first to fourth cycloidal grooves 302, 303, 103, and 203 is not limited to the aforementioned combination and may also be another combination. In this case, the calculation expressions (1) to (18) will differ from the aforementioned, but those calculation expressions can be easily derived on the basis of the same manner of thinking as the aforementioned.

Whatever combination is used for the combination of the epicycloidal curve and the hypocycloidal curve in the first to fourth cycloidal grooves 302, 303, 103, and 203, in order to realize the transmission ratio Gs of the rotation between the first steering shaft 1 and the second steering shaft 2 when the carrier 4 is fixed and the transmission ratio [1 Gs] of the rotation between the carrier 4 and the second steering shaft 2 when the first steering shaft 1 is fixed, the combination of the epicycloidal curve and the hypocycloidal curve based on the first to fourth cycloidal grooves 302, 303, 103, and 203, the radius Rr1 of the first basic circle of the cycloidal curve based on the third cycloidal groove disposed in the first steering shaft 1 and the difference dR between the radii of the large circle and the small circle, the radius Rr2 of the second basic circle of the cycloidal curve based on the fourth cycloidal groove disposed in the second steering shaft 2 and the difference dR between the radii of the large circle and the small circle, and the transmission ratio of the rotation between the first gear 12 and the second gear 16 determining the transmission ratio of the rotation between the motor 20 and the carrier 4 are set on the basis of calculation.

Second Exemplary Embodiment

Figure 5:
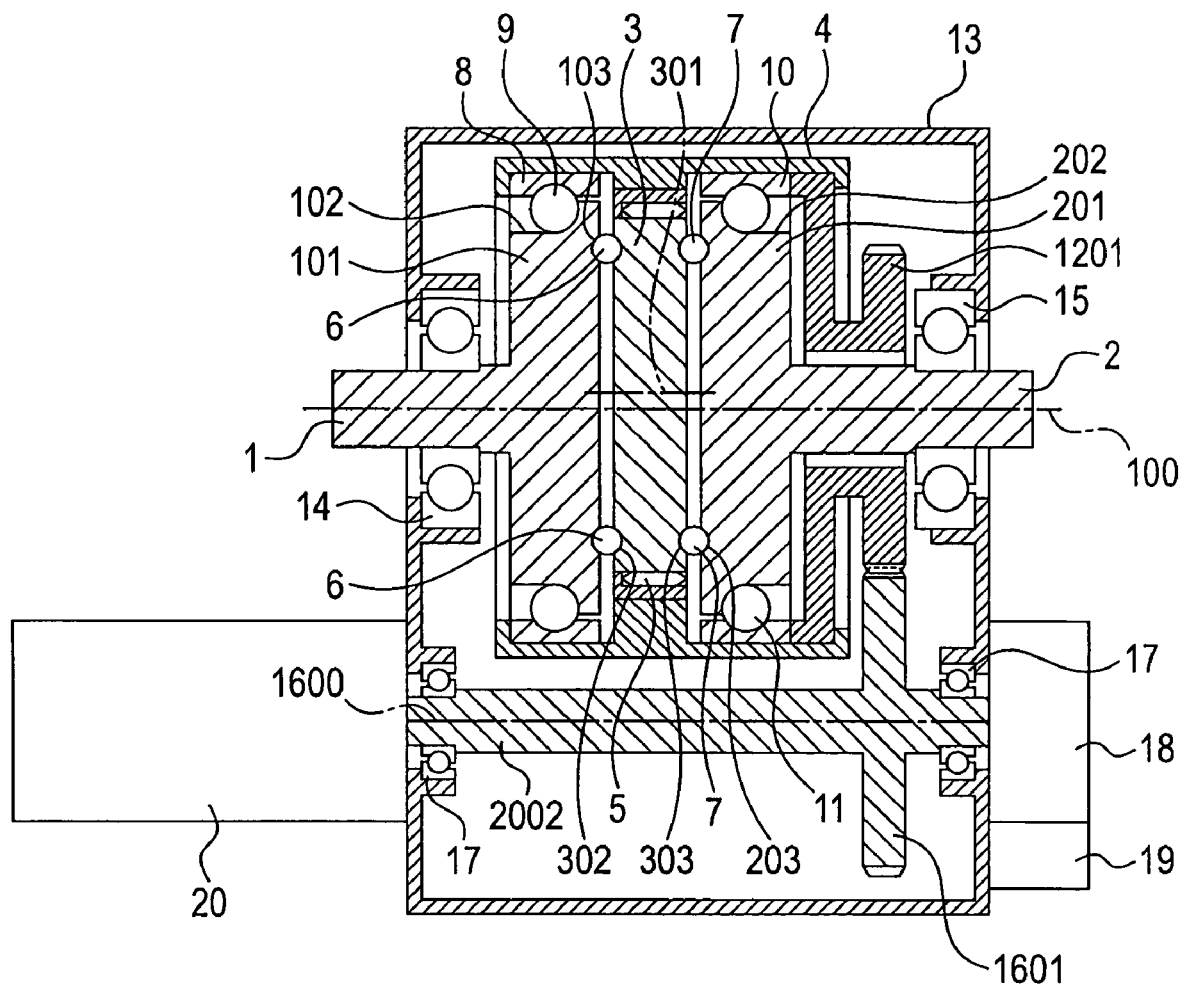
FIG. 5 is a cross-sectional diagram showing the configuration of a transmission ratio varying mechanism pertaining to a second exemplary embodiment of this invention.

FIG. 5 is a cross-sectional view showing the configuration of a transmission ratio varying mechanism pertaining to a second exemplary embodiment of this invention. In the first exemplary embodiment, the first gear 12 and the second gear 16 for causing the carrier 4 to rotate were configured by umbrella gears, and the direction of the axial center of the second gear 16 and the direction of the axial center of the rotor shaft 2001 of the motor 20 were disposed orthogonal with respect to the direction of the axial center of the carrier 4, but in the second exemplary embodiment, as shown in FIG. 5, a first gear 1201 and a second gear 1601 are configured by spur gears, and the direction of a rotor shaft 2002 of the motor 20 and an axial center 1600 of the second gear 1601 are disposed parallel to the direction of the axial center 100 of the carrier 4.

In this case, in order to minimize backlash of the first gear 1201 and the second gear 1601 configured by spur gears, it is preferable for the first gear 1201 and the second gear 1601 to be configured by scissor gears. The motor 20 is fixed to one axial-direction end portion of the housing 13, and the carrier fixing means 19 and the carrier rotation allowing means 18 are fixed to the other axial-direction end portion of the housing 13. The remaining configuration is the same as that of the transmission ratio varying mechanism of the first exemplary embodiment.

Similar to the transmission ratio varying mechanism of the first exemplary embodiment, in the transmission ratio varying mechanism of the second exemplary embodiment configured as described above, when the driver steers the steering handle and causes the first steering shaft 1 to rotate an angle of θ1, the second steering shaft 2 rotates an angle of θ2 based on expression (18) so that the steering wheel can be steered an angle of θ2. Additionally, because the rotation angle θc of the carrier 4 is controlled by the motor 20, it is possible to optionally obtain the rotation angle θ2 of the second steering shaft 2 regardless of the rotation angle θ1 of the first steering shaft 1, and the transmission ratio of the rotation between the first steering shaft 1 and the second steering shaft 2 can be varied.

According to the transmission ratio varying mechanism of the second exemplary embodiment, the axial-direction size on the input/output shaft can be reduced in comparison to that of the transmission ratio varying mechanism of the first exemplary embodiment.

Third Exemplary Embodiment

Figure 6:
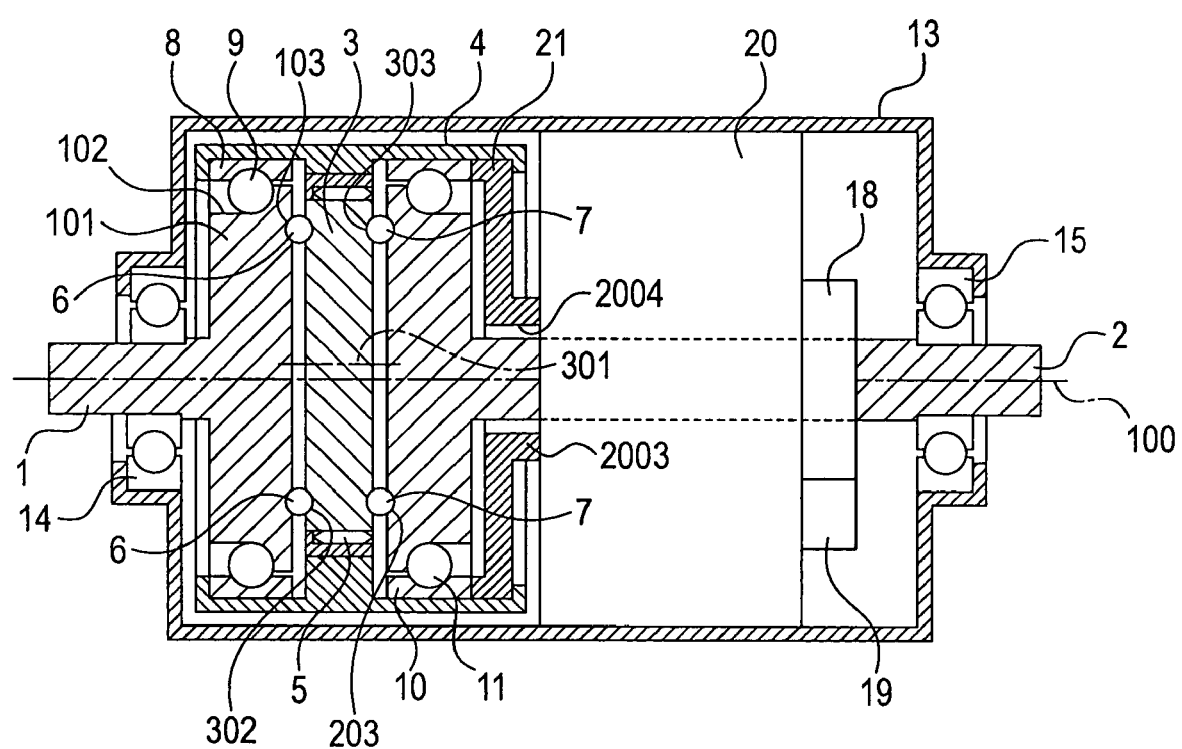
FIG. 6 is a cross-sectional diagram showing the configuration of a transmission ratio varying mechanism pertaining to a third exemplary embodiment of this invention.

FIG. 6 is a cross-sectional view showing the configuration of a transmission ratio varying mechanism pertaining to a third exemplary embodiment of this invention. In the transmission ratio varying mechanism according to the third exemplary embodiment, as shown in FIG. 6, the motor 20 configuring carrier driving means is disposed with a hollow rotating shaft 2003 that includes a through hole 2004 in its center portion. The axial center of the hollow rotating shaft 2003 is disposed on the same straight line as the axial center of the carrier 4. The second steering shaft 2 penetrates the through hole 2004 in the hollow rotating shaft 2003. The outer peripheral surface of a connecting member 21 is fixed to the inner peripheral surface of the carrier 4, and the center portion of the connecting member 21 is fixed to the end portion of the hollow rotating shaft 2003 of the motor 20.

The carrier fixing means 19 and the carrier rotation allowing means 18 are fixed to an axial-direction end portion of the motor 20 and are housed inside the housing 13. The carrier 4 is directly driven via the connecting member 21 by the motor 20 and not via a gear. The remaining configuration is the same as those of the first and second exemplary embodiments. It will be noted that the motor 20, the carrier fixing means 18, and the carrier rotation allowing means 19 may also be disposed on the first steering shaft 1 side and the first steering shaft 1 may penetrate the through hole 2004 in the hollow rotating shaft 2003.

In the transmission ratio varying mechanism of the third exemplary embodiment configured as described above, when the driver steers the steering handle and causes the first steering shaft 1 to rotate an angle of θ1, the second steering shaft 2 rotates an angle of θ2 based on expression (18) so that the steering wheel can be steered an angle of θ2. Additionally, because the rotation angle θc of the carrier 4 is controlled by the motor 20, it is possible to optionally obtain the rotation angle θ2 of the second steering shaft 2 regardless of the rotation angle θ1 of the first steering shaft 1, and the transmission ratio of the rotation between the first steering shaft 1 and the second steering shaft 2 can be varied.

According to the transmission ratio varying mechanism of the third exemplary embodiment, the size in the radial direction can be further reduced in comparison to those of the transmission ratio varying mechanisms of the first and second exemplary embodiments, and the motor 20, the carrier fixing means 19, and the carrier rotation allowing means 18 are housed inside the housing 13 so that the outer appearance of the transmission ratio varying mechanism can be made simple.

Fourth Exemplary Embodiment

Figure 7:
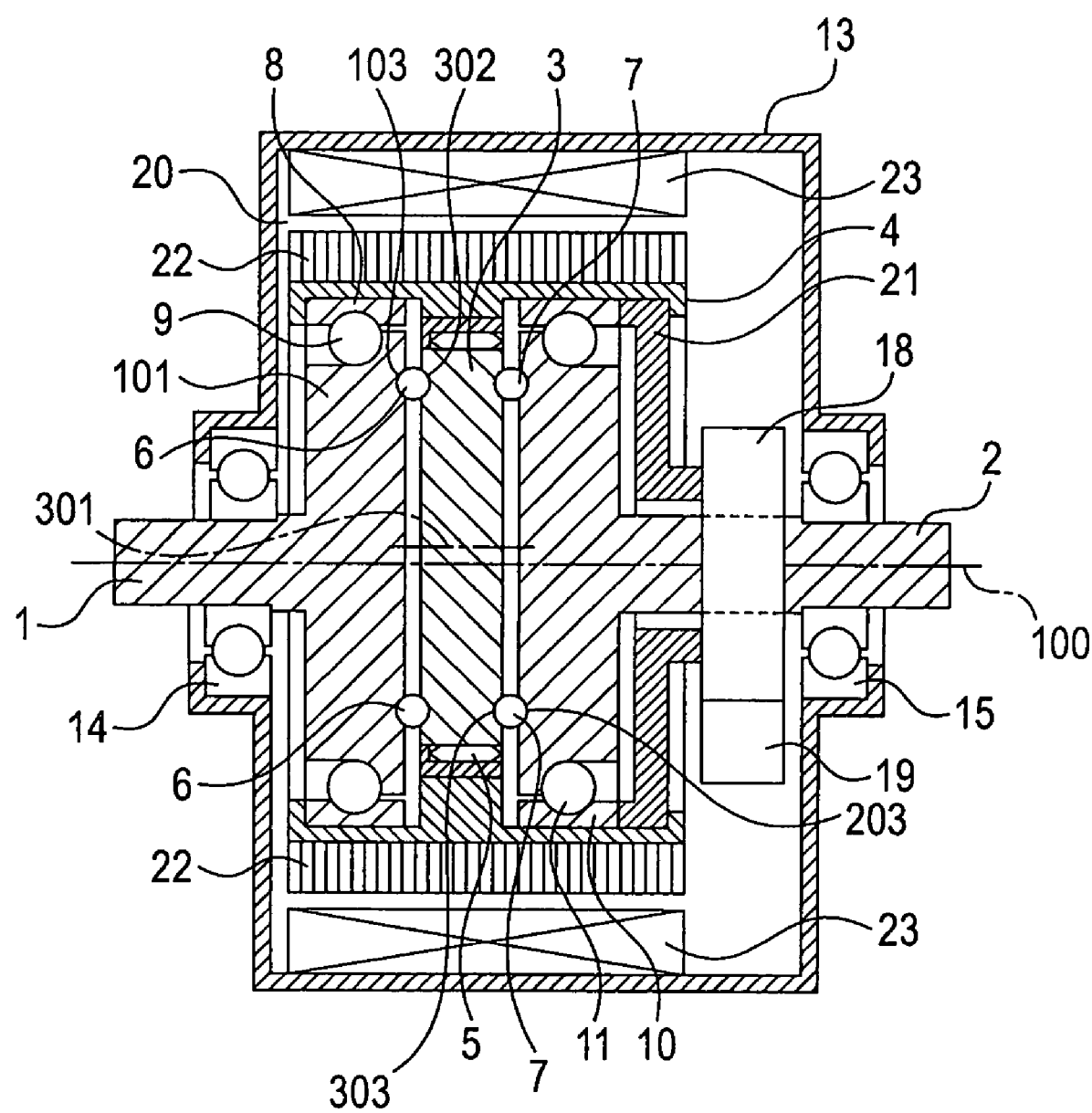
FIG. 7 is a cross-sectional diagram showing the configuration of a transmission ratio varying mechanism pertaining to a fourth exemplary embodiment of this invention.

FIG. 7 is a cross-sectional view showing the configuration of a transmission ratio varying mechanism pertaining to a fourth exemplary embodiment of this invention. In FIG. 7, the motor 20 is configured by a DC brushless motor and is disposed with a permanent magnet 22 fixed to the outer peripheral surface of the carrier 4 and a stator coil 23 fixed to the inner peripheral surface of the housing 13. The carrier 4 and the permanent magnet 22 configure the rotor of the motor 20. The conductive pattern of the stator coil 23 is controlled by a motor controller (not shown), and the stator coil 23 causes the rotor comprising the permanent magnet 22 and the carrier 4 to rotate a desired angle.

The outer peripheral surface of the connecting member 21 is fixed to the inner peripheral surface of the carrier 4, and the center portion of the connecting member 21 is coupled to the carrier rotation allowing means 18 and the carrier fixing means 19. The carrier rotation allowing means 18 and the carrier fixing means 19 are supported by the second steering shaft 2. A magnetic pole detector (not shown) that detects the rotational position of the permanent magnet 22 is disposed, the conductive pattern of the stator coil 23 is controlled in response to the output of the magnetic pole detector, and the rotation angle of the carrier 4—and therefore the rotation angle of the second steering shaft 2—is controlled. The remaining configuration is the same as those of the first and second exemplary embodiments.

It will be noted that an angle detector that detects the rotation angle of the carrier 4 may be disposed instead of the magnetic pole detector. Further, the motor 20 is not limited to a DC brushless motor that uses a permanent magnet and may also be a brush motor or a reluctance motor; anything is applicable as long as the motor is one which uses the carrier 4 as one configural member of a rotor and is capable of causing this to rotate.

In the transmission ratio varying mechanism of the fourth exemplary embodiment configured as described above, when the driver steers the steering handle and causes the first steering shaft 1 to rotate an angle of θ1, the second steering shaft 2 rotates an angle of θ2 based on expression (18) so that the steering wheel can be steered an angle of θ2. Additionally, because the rotation angle θc of the carrier 4 is controlled by the motor 20, it is possible to optionally obtain the rotation angle θ2 of the second steering shaft 2 regardless of the rotation angle θ1 of the first steering shaft 1, and the transmission ratio of the rotation between the first steering shaft 1 and the second steering shaft 2 can be varied.

According to the transmission ratio varying mechanism of the fourth exemplary embodiment, the axial-direction lengths of the first and second steering shafts can be shortened, and the outer appearance of the transmission ratio varying mechanism can be made simple.

Various modifications and alterations of this invention will be apparent to those skilled in the art without departing from the scope and sprit of this invention, and it should be understood that this is not limited to the illustrative embodiments set forth herein.

What is claimed is:

1. A transmission ratio varying mechanism that is joined to a first steering shaft that rotates integrally with a steering handle and to a second steering shaft that is disposed coaxially with the first steering shaft and rotates integrally with a steering member that steers steered wheels, with the transmission ratio varying mechanism performing transmission of rotation between the first steering shaft and the second steering shaft and being capable of varying the transmission ratio of that rotation, the transmission ratio varying mechanism comprising:

an eccentric rotary plate that is disposed facing the first steering shaft and the second steering shaft and is eccentrically rotatable with respect to these steering shafts;

a carrier that rotatably supports the eccentric rotary plate and is rotatably disposed coaxially with respect to the first steering shaft and the second steering shaft; and carrier driving means that causes the carrier to rotate, wherein the eccentric rotary plate includes, in its surface facing the first steering shaft, a first cycloidal groove configured on the basis of a cycloidal curve and includes, in its surface facing the second steering shaft, a second cycloidal groove configured on the basis of a cycloidal curve, the first steering shaft includes, in its surface facing the eccentric rotary plate, a third cycloidal groove configured on the basis of a cycloidal curve, the second steering shaft includes, in its surface facing the eccentric rotary plate, a fourth cycloidal groove configured on the basis of a cycloidal curve, the first cycloidal groove and the second cycloidal groove are formed concentrically with an axial center of the eccentric rotary plate, the third cycloidal groove and the fourth cycloidal groove are formed concentrically with an axial center of the first steering shaft and the second steering shaft, transmission of the rotation of the first steering shaft and the eccentric rotary plate is performed via a first rotation transmitting ball group that engages with the third cycloidal groove and the first cycloidal groove, transmission of the rotation of the eccentric rotary plate and the second steering shaft is performed via a second rotation transmitting ball group that engages with the second cycloidal groove and the fourth cycloidal groove, the first to fourth cycloidal grooves are configured to vary the transmission ratio of the rotation between the first steering shaft and the eccentric rotary plate and the transmission ratio of the rotation between the second steering shaft and the eccentric rotary plate, and the carrier driving means causes the carrier to rotate, whereby the transmission ratio varying mechanism varies the transmission ratio of the rotation between the first steering shaft and the second steering shaft.

2. The transmission ratio varying mechanism of claim 1, wherein one of the first cycloidal groove and the third cycloidal groove is configured on the basis of an epicycloidal curve and the other is configured on the basis of a hypocycloidal curve, one of the fourth cycloidal groove and the second cycloidal groove is configured on the basis of an epicycloidal curve and the other is configured on the basis of a hypocycloidal curve, the first cycloidal groove and the third cycloidal groove are configured on the basis of a cycloidal curve including a first basic circle, the fourth cycloidal groove and the second cycloidal groove are configured on the basis of a cycloidal curve including a second basic circle, and the first basic circle and the second basic circle have different radii.

3. The transmission ratio varying mechanism of claim 1, further comprising carrier fixing means capable of prohibiting the rotation of the carrier.

4. The transmission ratio varying mechanism of claim 3, further comprising carrier rotation allowing means that allows the rotation of the carrier when force equal to or greater than a predetermined value acts on the carrier fixing means.

5. The transmission ratio varying mechanism of claim 1, wherein pressure is applied in the direction of the eccentric rotary plate to the first steering shaft and the second steering shaft.

6. The transmission ratio varying mechanism of claim 1, further comprising a first gear that is fixed to the carrier and includes an axial center on the same straight line as the axial center of the carrier and a second gear that includes an axial center in a direction orthogonal to the direction of the axial center of the carrier and engages with the first gear, wherein the carrier driving means is configured to drive the carrier by driving the second gear.

7. The transmission ratio varying mechanism of claim 1, further comprising a first gear that is fixed to the carrier and includes an axial center on the same straight line as the axial center of the carrier and a second gear that includes an axial center in a direction parallel to the direction of the axial center of the carrier and engages with the first gear, wherein the carrier driving means is configured to drive the carrier by driving the second gear.

8. The transmission ratio varying mechanism of claim 1, wherein the carrier driving means includes a hollow rotating shaft whose center portion is penetrated by the second steering shaft or the first steering shaft, and the carrier driving means drives the carrier by the hollow rotating shaft.

9. The transmission ratio varying mechanism of claim 1, wherein the carrier driving means is configured by a motor which uses the carrier as one configural member of a rotor.

* * * * *